United States Patent
Lantz et al.

(10) Patent No.: US 6,733,136 B2
(45) Date of Patent: May 11, 2004

(54) VIDEO-BASED IMMERSIVE THEATER

(75) Inventors: Edward J. Lantz, Parkesburg, PA (US); Mark S. Jarvis, Bethel, PA (US)

(73) Assignee: Spitz, Inc., Chadds Ford, PA (US)

( * ) Notice: Subject to any disclaimer, the term of this patent is extended or adjusted under 35 U.S.C. 154(b) by 0 days.

(21) Appl. No.: 10/163,765

(22) Filed: Jun. 6, 2002

(65) Prior Publication Data

US 2002/0196538 A1 Dec. 26, 2002

Related U.S. Application Data

(60) Provisional application No. 60/296,169, filed on Jun. 6, 2001.

(51) Int. Cl.[7] .................. G03B 21/14; G03B 21/26; G03B 21/00; H04N 7/00
(52) U.S. Cl. .................. 353/79; 353/30; 353/121; 353/122; 348/36
(58) Field of Search .................. 348/36; 353/121, 353/122, 79, 30

(56) References Cited

U.S. PATENT DOCUMENTS

| | | | |
|---|---|---|---|
| 3,695,751 A | * 10/1972 | Watanuki | 352/70 |
| 4,012,126 A | 3/1977 | Rosendahl et al. | 350/198 |
| 4,070,098 A | 1/1978 | Buchroeder | 350/198 |
| 4,154,514 A | 5/1979 | Harvey | 352/69 |
| 4,427,274 A | 1/1984 | Pund et al. | 353/99 |
| 4,484,801 A | 11/1984 | Cox | 350/44 |
| 4,547,050 A | 10/1985 | Collender | 352/43 |
| 5,136,390 A | 8/1992 | Inova et al. | 358/231 |
| 5,175,575 A | 12/1992 | Gersuk | 353/94 |
| 5,376,980 A | 12/1994 | Gersuk et al. | 353/94 |
| 5,541,769 A | 7/1996 | Ansley et al. | 359/451 |
| 5,627,675 A | 5/1997 | Davis et al. | 359/366 |
| 5,631,778 A | 5/1997 | Powell | 359/724 |
| 5,638,208 A | 6/1997 | Walker | 359/433 |
| 5,724,775 A | 3/1998 | Zobel, Jr. et al. | 52/82 |
| 5,760,826 A | 6/1998 | Nayar | 348/36 |
| 5,762,413 A | 6/1998 | Colucci et al. | 353/122 |
| 5,790,182 A | 8/1998 | St. Hilaire | 348/36 |
| 5,847,879 A | 12/1998 | Cook | 359/631 |
| 6,220,713 B1 | 4/2001 | Tadic-Galeb et al. | 353/77 |
| 2001/0040671 A1 | * 11/2001 | Metcalf | 353/94 |
| 2002/0009699 A1 | * 1/2002 | Hyodo et al. | 434/285 |
| 2002/0131018 A1 | * 9/2002 | Lucas | 352/85 |
| 2002/0141053 A1 | * 10/2002 | Colucci et al. | 359/435 |

OTHER PUBLICATIONS

Kinder, Floyd A., "Visual Control Using Wide Angle Displays (VISCON)", Society of Photo–Optical Instrumentation Engineers Seminar Proceedings (Photo–Optical Techniques in Simulators), vol. 17, pp. 103–105 (1969).

* cited by examiner

Primary Examiner—Russell Adams
Assistant Examiner—Melissa J Koval
(74) Attorney, Agent, or Firm—Gary M. Cohen

(57) ABSTRACT

Ultra-wide field-of-view images are projected onto a spherical or near-spherical screen that wraps around viewers to provide a visually immersive effect. Images are acquired using a novel lens system in conjunction with standard high-resolution video or film cameras. Acquired images are then relayed onto a curved screen using a correspondingly configured, projection lens system coupled with a standard high-resolution video or film projector. A unique screen design complements the image format to provide a complete end-to-end imaging and projection system. The resulting system allows the images to be projected onto a spherical or curved screen, using a single projector and a "fisheye" or "omni" projection format, from a projection point which is approximately one radii behind the radial center of the spherical or near-spherical screen, providing a total projection distance of one screen diameter from the screen surface.

91 Claims, 12 Drawing Sheets

VIDEO-BASED IMMERSIVE THEATER

CROSS-REFERENCE TO RELATED APPLICATION

This application claims the benefit of U.S. Provisional Application No. 60/296,169, filed Jun. 6, 2001.

BACKGROUND OF THE INVENTION

The present invention generally relates to the acquisition and projection of ultra-wide field-of-view images on a spherical or near-spherical screen that wraps around viewers to provide a visually immersive effect.

The present invention is preceded by a century of improvements to cinema systems providing a progressively wider field of view, particularly in the horizontal dimension. Such advancements include "Cinerama", a 3-projector, edge-abutted system which was later replaced by single-projector 70 mm film formats including "Todd-AO", and more recently, the "IMAX" and "IMAX Dome" formats. While 70 mm film can produce an impressive image that is large, bright and high-resolution, it remains quite expensive to produce, distribute and project such films. "IMAX Dome" theaters utilize spherical screens to provide the widest possible field of view images.

More recently, pioneering work has been performed using video projection to cover ultra-wide field-of-view screens that are spherical or near spherical in form. To this end, the "ImmersaVision™" video projection format (available from Spitz, Inc.) has been developed, allowing seamless ultra-wide field-of-view images to be projected onto compound surfaces such as dome, cylinder or torus screens. The "ImmersaVision 200" format, shown in FIGS. 1 to 3, currently produces a 200° horizontal by ±30° vertical field-of-view image on a spherical screen using three CRT video projectors which are edge-blended using Panomaker units, for example, and which are mapped using extended geometry adjustments provided by Barco NV, BR909 CRT projectors, for example. Graphic material is originated in an equidistant cylindrical mapping using an 1800×486 rectangular pixel image plane (true 10:3 aspect ratio), as represented in FIG. 4. The image is then broken into three overlapped 720×486 pixel (CCIR-601 format) video subframes for storage and playback. Upon playback, the subframes must be processed to provide feathering of the overlapped edges (edge-blending), and must be geometrically mapped to the spherical screen surface.

While such an approach provides an adequate display, CRT projectors cannot provide the brightness required of theatrical systems, and edge-blended systems remain expensive and problematic. Such systems inevitably suffer some image degradation within the blend regions, and the need to break the single 10:3 image into sub-frames complicates the post-production process. With the use of alternative projection technologies, such as the JVC Digital Image Light Amplifier (D-ILA), liquid crystal displays (LCD) and digital light processing (DLP) using micro-mirror devices, it would be possible to achieve greater brightness. The available technologies, however, including DLP, LCoS (liquid crystal on silicon), LCD and others must provide highly accurate image mapping and color matching between projectors, which is an expensive and difficult process. Also, edge-blending is problematic in that image quality is compromised in the edge-blended areas due to imperfect geometric mapping, gamma and color mismatch between projectors, etc.

SUMMARY OF THE INVENTION

The present invention provides a novel full-motion graphics format enabling acquisition and projection of ultra-wide field-of-view images. Such images are viewed on a spherical or near-spherical screen that wraps around the viewers to provide a visually immersive effect. To this end, ultra-wide field-of-view images are acquired using a novel lens system in conjunction with standard high-resolution video cameras or film cameras, permitting the images to be stored on standard digital or film media. The acquired images are then relayed onto a curved screen using a correspondingly configured, novel projection lens system, in conjunction with a standard high-resolution video projector or film projector. Further, in accordance with the present invention, a unique, manufacturable screen design is provided that complements the image format to provide a complete end-to-end imaging and projection system. An important and distinguishing feature of the present invention is that the images are projected onto a spherical or curved screen from a projection point which is approximately one radii behind dome center (the radial center of the spherical or near-spherical screen).

In its preferred embodiment, the system of the present invention uses a single film or video projector to produce an ultra-widescreen format, permitting a single high-performance, high-definition film or video projector to replace the three separate projectors of the prior systems. As a result, problematic edge-blending and precise geometric overlap are no longer required. Such a system is enabled using a "fisheye" or "omni" projection format. Unlike previous fisheye and omni projection formats that place the projection lens toward the center of the spherical screen, however, the system of the present invention places the projector one radii behind the center of the spherical screen, providing a total projection distance of one screen diameter from the screen surface.

DETAILED DESCRIPTION OF THE INVENTION

Figure 1:
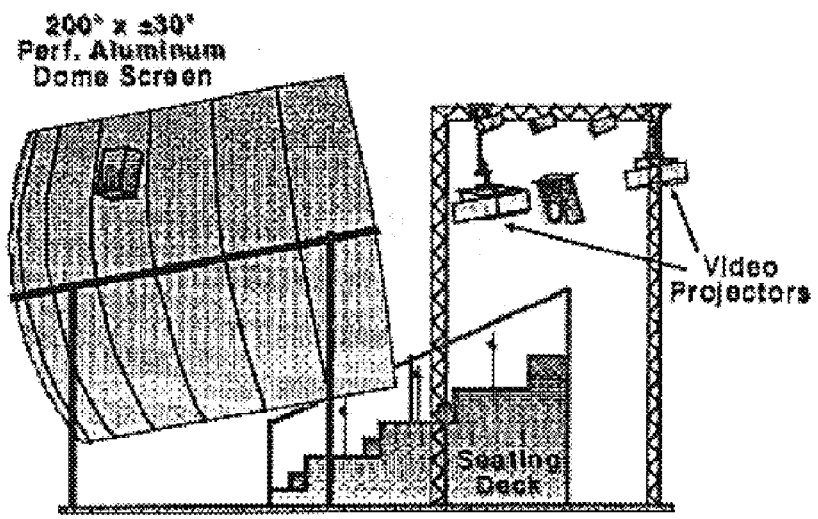
FIG. 1 is an elevational view of a prior image-projecting system for producing a 200° horizontal by ±30° vertical field-of-view image on a spherical screen using three edge-blended CRT video projectors.
Figure 2:
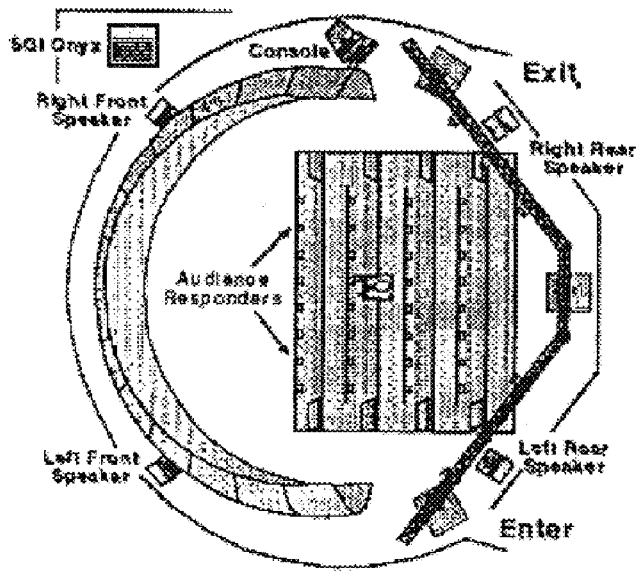
FIG. 2 is a top plan view of the system illustrated in FIG. 1.
Figure 3:
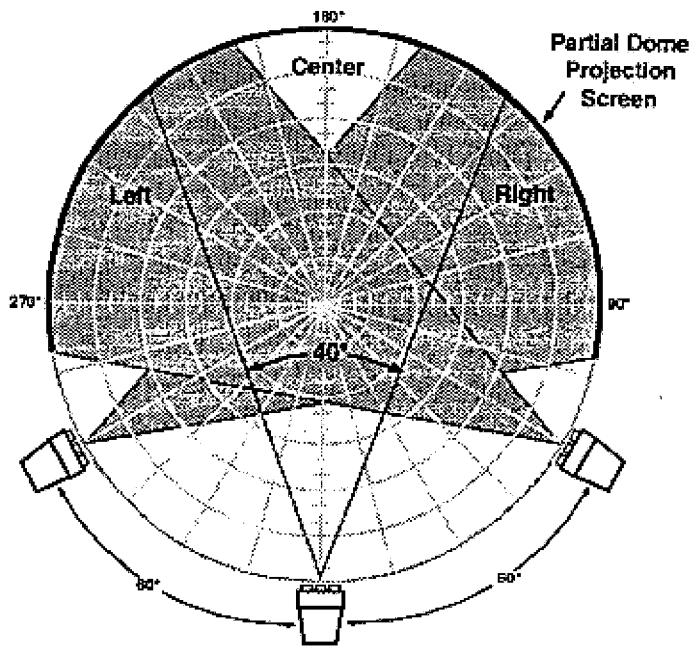
FIG. 3 is a schematic view showing the image-projecting format produced using the system of FIG. 1.
Figure 4:
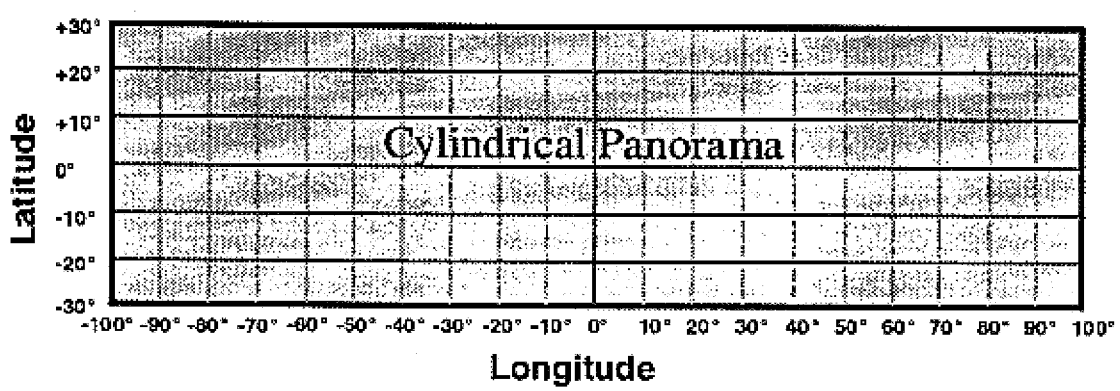
FIG. 4 is a graphical representation of equidistant cylindrical mapping using an 1800×486 rectangular pixel image plane to produce a true 10:3 aspect ratio.
Figure 5:
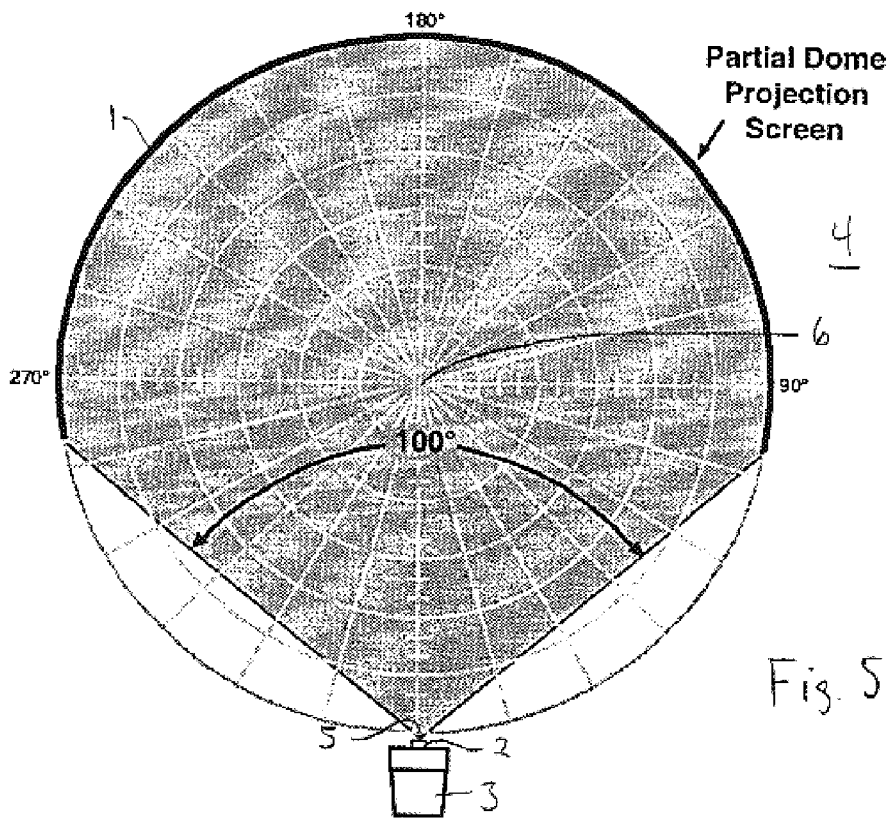
FIG. 5 is a plan view showing the projection geometry for the image-projecting system of the present invention.

Referring to FIG. 5, the present invention provides a full-motion graphics format enabling acquisition and projection of ultra-wide field-of-view images. The images are viewed on a spherical or near-spherical screen 1 that wraps around the viewers to provide a visually immersive effect. To this end, ultra-wide field-of-view images are acquired using a lens system in conjunction with standard high-resolution video cameras or film cameras, permitting the images to be stored on standard digital or film media. The acquired images are then relayed onto the curved screen 1 using a correspondingly configured, novel projection lens system 2, in conjunction with a standard high-resolution video projector or film projector 3. The screen 1 is preferably implemented with a unique, manufacturable screen design that complements the image format to provide a complete end-to-end imaging and projection system 4. An important and distinguishing feature of the resulting system 4 is that the images are projected onto a spherical or curved screen 1 from a projection point 5 which is approximately one radii behind dome center 6 (the radial center of the spherical or near-spherical screen).

In its preferred embodiment, the system 4 uses a single film or video projector 3 to produce an ultra-widescreen format, permitting a single high-performance, high-definition film or video projector to replace the three or more separate projectors of prior systems. This is enabled using a "fisheye" or "omni" projection format. Unlike previous fisheye and omni projection formats that place the projection lens toward the center 6 of the spherical screen 1, however, the system 4 of the present invention places the projector 3 one radii behind the center 6 of the spherical screen 1, providing a total projection distance of one screen diameter from the screen surface.

A fisheye-type lens (azimuthal equidistant polar mapping) is coupled with the single projector to yield a unique projection configuration. Accurate pixel mapping is provided due to an angle multiplication factor of 2, with respect to the dome coordinates, of angles projected from the dome diameter, as opposed to the dome center. As a result, fisheye projection from the dome diameter provides the equivalent of a fisheye projection from the dome center with twice the angular spread. This simplifies the lens design by halving the required field of view.

Figure 6A:
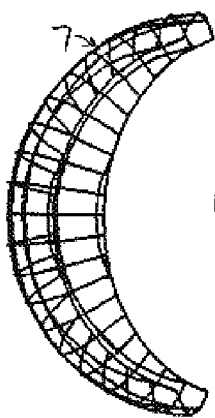
FIG. 6A is top plan view showing the projection geometry of a 16:9 aspect ratio.
Figure 6B:
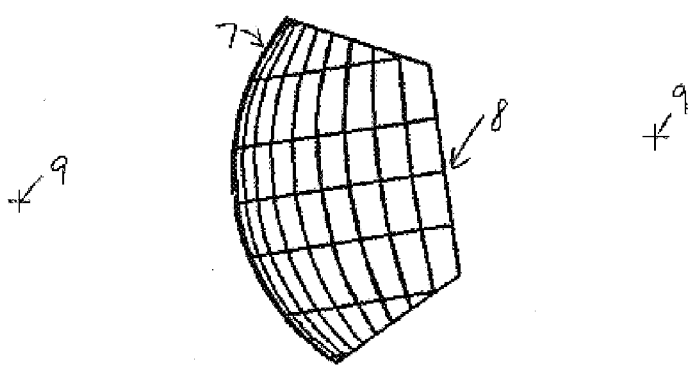
FIG. 6B is an elevational view of the projection geometry shown in FIG. 6A.
Figure 6C:
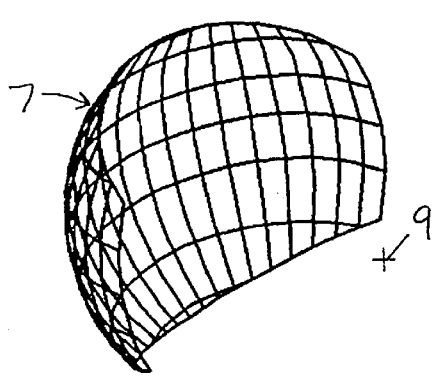
FIG. 6C is an isometric view of the projection geometry shown in FIG. 6A.

Since the fisheye-type lens is projecting an image produced by a rectangular film area, or a spatial light modulator area, a unique screen geometry 7 results. Referring to FIGS. 6A, 6B and 6C, a 16:9 aspect ratio such as that provided by a typical high definition television format spatial light modulator truncation at the image plane of a fisheye lens results in a dome screen geometry that bulges on the top and bottom edges. When seated in the theater, slightly behind dome center (shown schematically at 8), this bulge adds to the field-of-view at the center of the screen, where it is needed the most. Such a screen better matches the visual preferences of the human eye. The cross hair 9 represents the projector viewpoint or node.

Figure 7A:
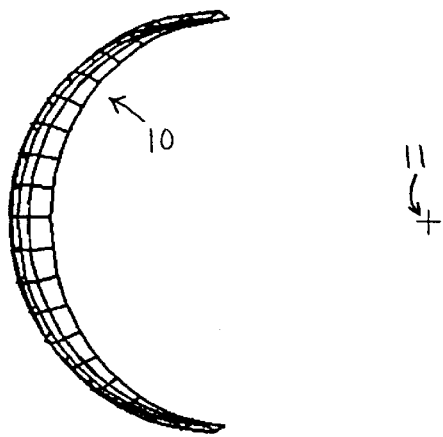
FIG. 7A is top plan view showing the projection geometry of a 10:3 aspect ratio.
Figure 7B:
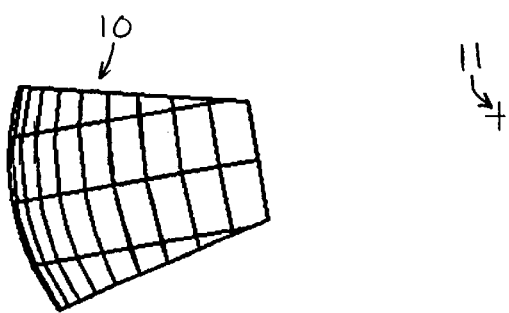
FIG. 7B is an elevational view of the projection geometry shown in FIG. 7A.
Figure 7C:
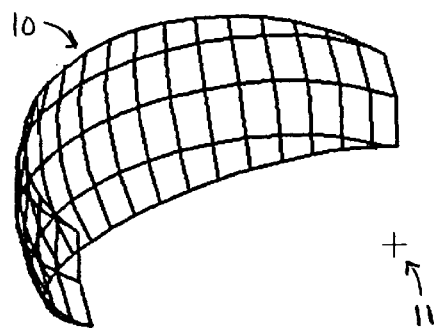
FIG. 7C is an isometric view of the projection geometry shown in FIG. 7A.

While the geometry 7 is somewhat attractive from a visual standpoint, a building having a ceiling which is significantly higher than is necessary for current systems will be required, leaving the geometry 7 economically less attractive. In accordance with the present invention, it has been found that the 10:3 aspect ratio format which is ordinarily preferred for such reasons, and which is shown at 10 in FIGS. 7A, 7B and 7C with the projector placed at 11, can be approximated using an anamorphic element attached to the projection lens or by truncating the image aspect ratio at the image plane, as will be discussed more fully below.

It is presently considered highly desirable that the edges of the (dome-shaped) screen lie on a plane. Primarily, this facilitates fabrication of the screen because the dome frame which runs along the screen edges should not be required to have a compound curve. This also helps prevent the presentation of a "bow tie" shaped aspect ratio, as seen from the position of the projector 11 (i.e., one dome radius behind dome center), which would then require cropping or re-mapping of the video frames to match the screen. To the extent possible, the geometry of the screen should present a true rectangular aspect ratio to the projector.

Figure 8:
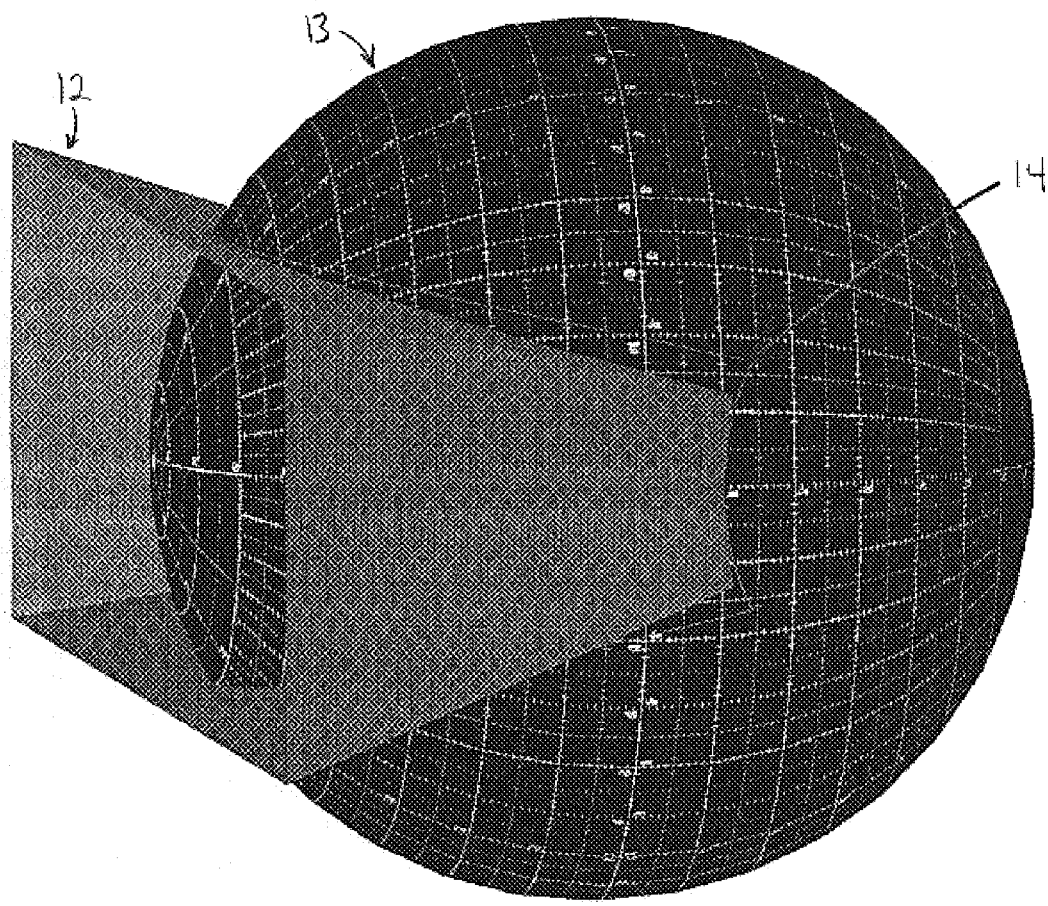
FIG. 8 is an isometric view showing the generation of a screen geometry by intersecting a pyramid with a sphere.

A first-order approximation of a projection screen having such a configuration is provided by intersecting a "projection pyramid" 12 with a spherical surface 13, as shown in FIG. 8. The screen surface would then be the section of the sphere that falls within the pyramid. In practice, however, the actual (fisheye) image, shown at 14, does not match the screen as closely as would ordinarily be preferred, which would tend to result in a loss of image.

Figure 9:
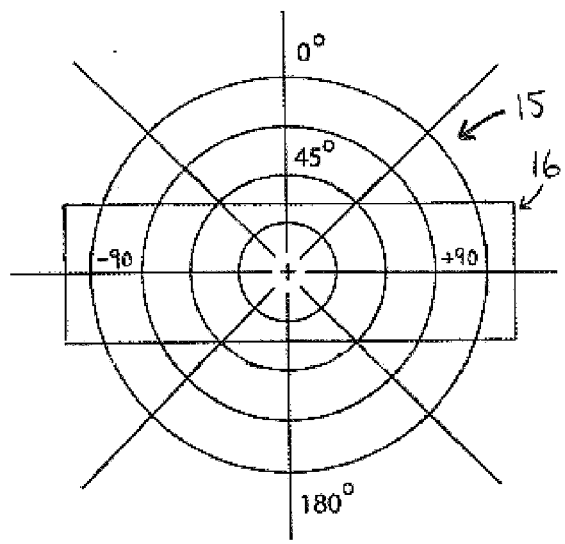
FIG. 9 is a schematic representation of a rectangular image frame shown on an equidistant polar mapping of a dome-shaped screen.
Figure 10:
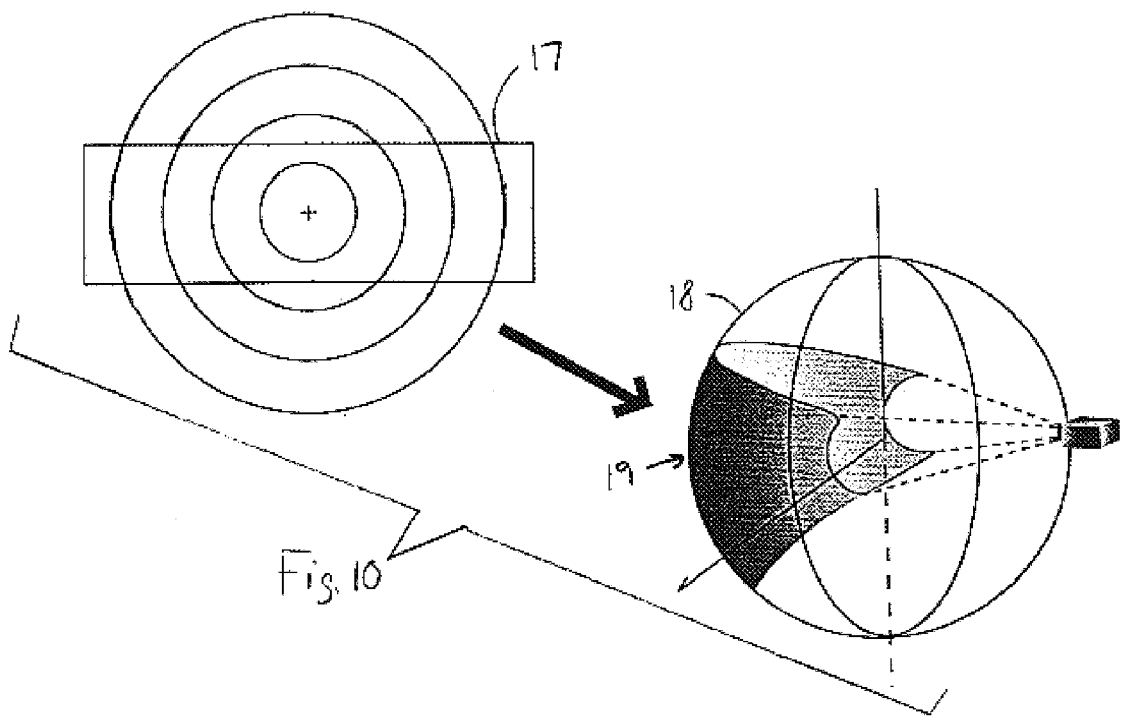
FIG. 10 is a schematic representation showing projection of the rectangular image frame shown in FIG. 9 onto a dome-shaped screen.

A closer fit to the actual projected image can be produced by establishing the planes that would most closely approximate the edges of the fisheye frame that intersect the spherical screen surface. A fisheye lens ideally provides an equidistant polar mapping, and the actual image source (whether film or video) can then be a rectangular frame. This is shown with reference to FIG. 9, which is provided for nominal values including a ±100 degree (horizontal) by ±30 degree (vertical) field of view and an image aspect ratio of 10:3. As is illustrated, the projection of an image of dome screen coordinates (equidistant polar coordinates 15) back through the fisheye lens, onto the image modulator (the image modulator area 16), should ideally correspond to a rectangular frame (film or video) projected through the fisheye lens onto the dome screen. As is further illustrated in FIG. 10, this results in the projection of a rectangular frame 17 through the fisheye lens and onto a dome 18 with the proper screen geometry 19 for producing the desired image.

The following three steps can be used to generate a screen geometry such that all screen edges lie on planes. In a first step, three points are defined along the sphere that lie on a given image edge. In a second step, a circle is derived on the sphere that passes through the three defined points. In a third step, this process is repeated for all edges of the image on the sphere. Because most computer aided design packages can derive a circle from three points in cartesian coordinates, or derive a plane from three given points and then intersect the derived plane with the sphere, defining the required circle, the second step is readily performed without analytical techniques using available computer aided design packages.

Figure 11:
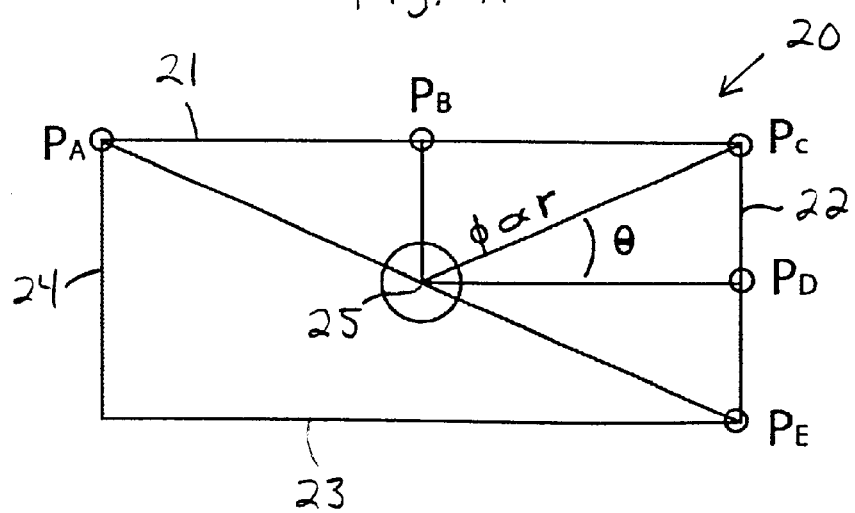
FIG. 11 is a schematic representation showing a series of points defined along an image frame, and their corresponding polar coordinates.
Figure 12:
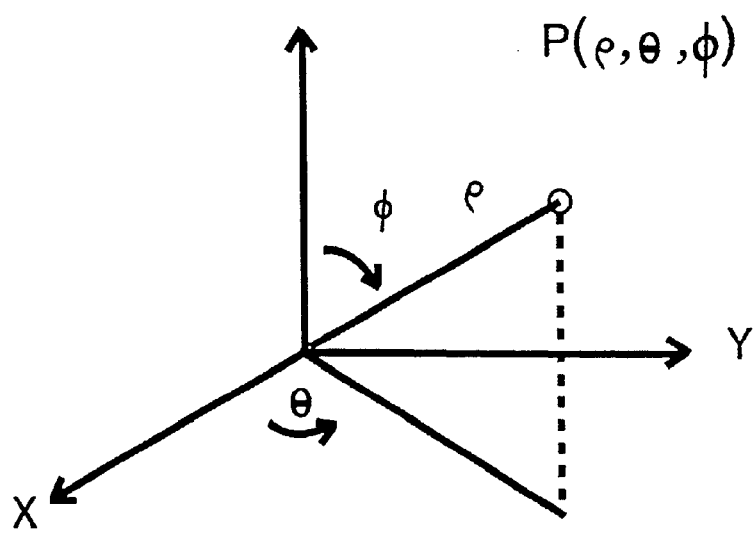
FIG. 12 is a schematic representation of a corresponding spherical coordinate system.

As an example, and with reference to FIG. 11, consider a rectangular frame 20 in equidistant polar coordinates. The three points $P_A$, $P_B$, $P_C$ define one plane 21, while the three points $P_C$, $P_D$, $P_E$ define another plane 22. The remaining two planes 23, 24 are mirror images of the first two planes 21, 22 due to symmetry. In this example, note that the spherical screen radius is assumed to be at the origin 25, and all chosen points are a function of spherical coordinates $\rho$, $\theta$, $\phi$, referring to the convention shown in FIG. 12. It may further be assumed that the image aspect ratio is fixed, and given by the equation:

$$A = W/H$$

Where

A=aspect ratio;
W=screen width; and
H=screen height.

The fisheye lens transforms the polar coordinates r, θ (on the image modulator) into output angles. The horizontal and vertical output fields of view (corresponding to the frame edges) are then expressed as:

$\phi_H$=Total desired horizontal field of view of screen; and
$\phi_W$=Total desired vertical field of view of screen.

The spherical coordinates are therefore found to be:

| | ρ | θ | φ |
|---|---|---|---|
| $P_A$ | dome radius | $180° - \tan^{-1}\left(\frac{1}{A}\right)$ | $\frac{1}{2}\sqrt{\phi_W^2 + \phi_H^2}$ |
| $P_B$ | dome radius | 90° | $\frac{1}{2}\phi_H$ |
| $P_C$ | dome radius | $\tan^{-1}\left(\frac{1}{A}\right)$ | $\frac{1}{2}\sqrt{\phi_W^2 + \phi_H^2}$ |
| $P_D$ | dome radius | 0 | $\frac{1}{2}\phi_W$ |
| $P_E$ | dome radius | $-\tan^{-1}\left(\frac{1}{A}\right)$ | $\frac{1}{2}\sqrt{\phi_W^2 + \phi_H^2}$ |

This yields:

TABLE 1

| | θ | φ |
|---|---|---|
| $P_A$ | 163.3° | 104.4° |
| $P_B$ | 90° | 30° |
| $P_C$ | 16.7° | 104.4° |
| $P_D$ | 0 | 100° |
| $P_E$ | -16.7° | 104.4° |

It is then a simple matter to transform these spherical coordinates into rectangular coordinates using the expressions:

$X = \rho \sin\phi \cos\theta$;
$Y = \rho \sin\phi \sin\theta$; and
$Z = \rho \cos\phi$, yielding:

TABLE 2

| | X | Y | Z |
|---|---|---|---|
| $P_A$ | -0.9277ρ | 0.2783ρ | -0.2487ρ |
| $P_B$ | 0 | 0.5ρ | 0.866ρ |
| $P_C$ | 0.9277ρ | 0.2783ρ | -0.2487ρ |
| $P_D$ | 0.9848ρ | 0 | -0.1736ρ |
| $P_E$ | 0.9277ρ | -0.2783ρ | -0.2487ρ |

Figure 13:
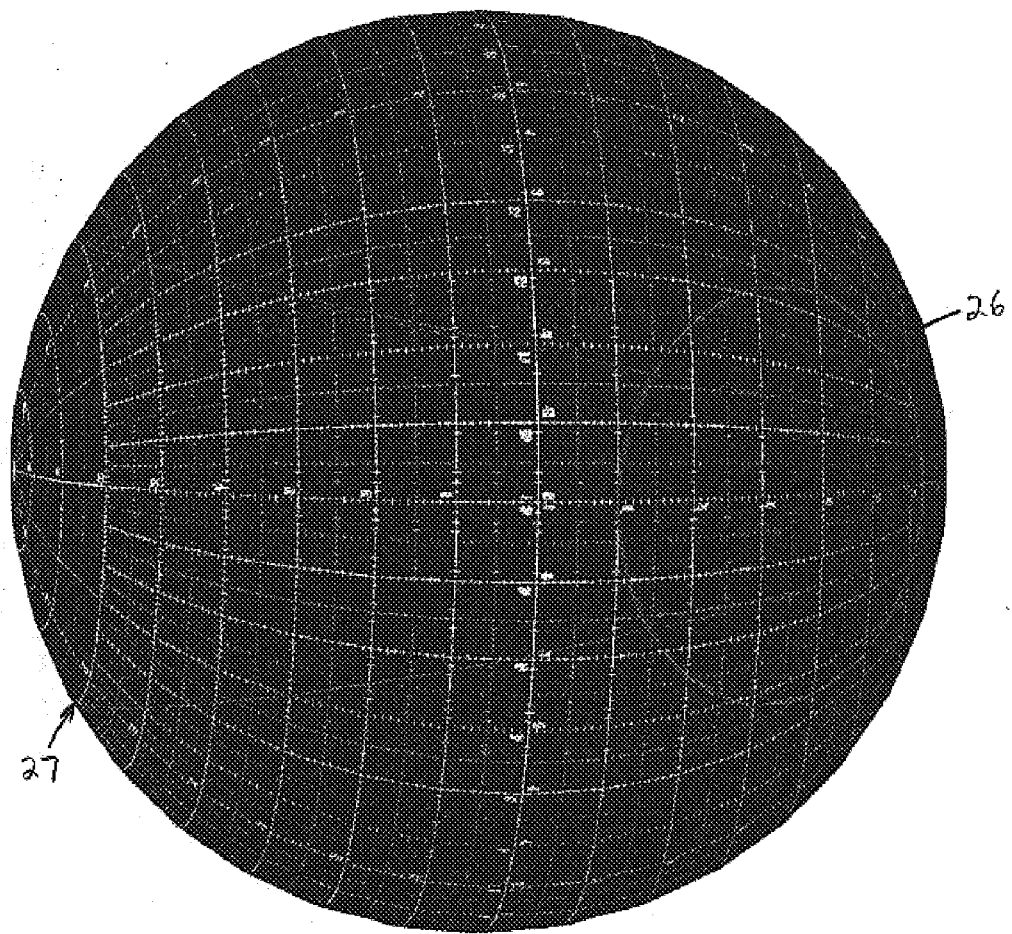
FIG. 13 is an isometric view showing the generation of a screen geometry produced by theoretically calculated circles on a sphere.

Thus, for a 10:3 screen aspect ratio with $\phi_W=200°$ and $\phi_H=60°$, A=3.3333. As is shown in FIG. 13, the circles 26 formed through these sets of points correspond very closely to the actual edges 27 of the projected image, yielding a screen design that makes efficient use of the image area, yet which is easily manufacturable.

Figure 14A:
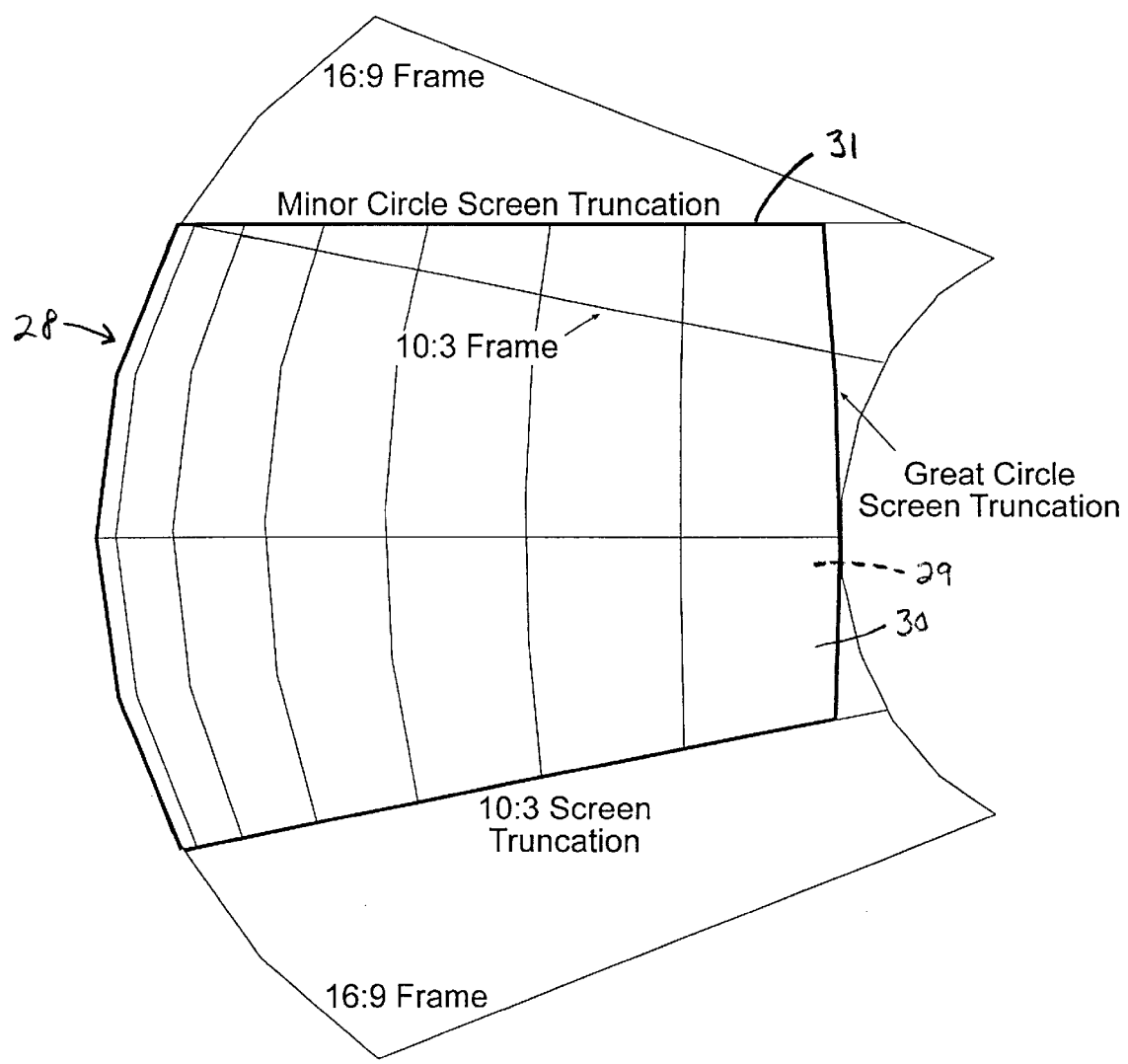
FIG. 14A schematically illustrates the truncation of a screen produced in accordance with the present invention.

In certain circumstances it can be desirable to truncate the screen along other defined boundaries. For example, the screen 28 shown in FIG. 14A is truncated along a great circle on the right edge 29 and the left edge 30, and along a horizontal minor circle along the top edge 31. The horizontal minor circle and the vertical great circle correspond to common longitude and latitude lines on the sphere and are most easily achieved by standard screen design principles which are themselves known.

Great circle truncation can be more pleasing to the eye, although some image is lost in such cases, and the alternative top-edge truncation is parallel with the ceiling of the structure (the theater) receiving the screen, thereby making the most efficient use of available ceiling height and gaining some image beyond the 10:3 frame. The extended image frame which results must then be accounted for in the image-production process by expanding the image area on the camera viewfinder beyond the 10:3 frame, or with the alternative great-circle truncation, by narrowing the image size.

Figure 14B:
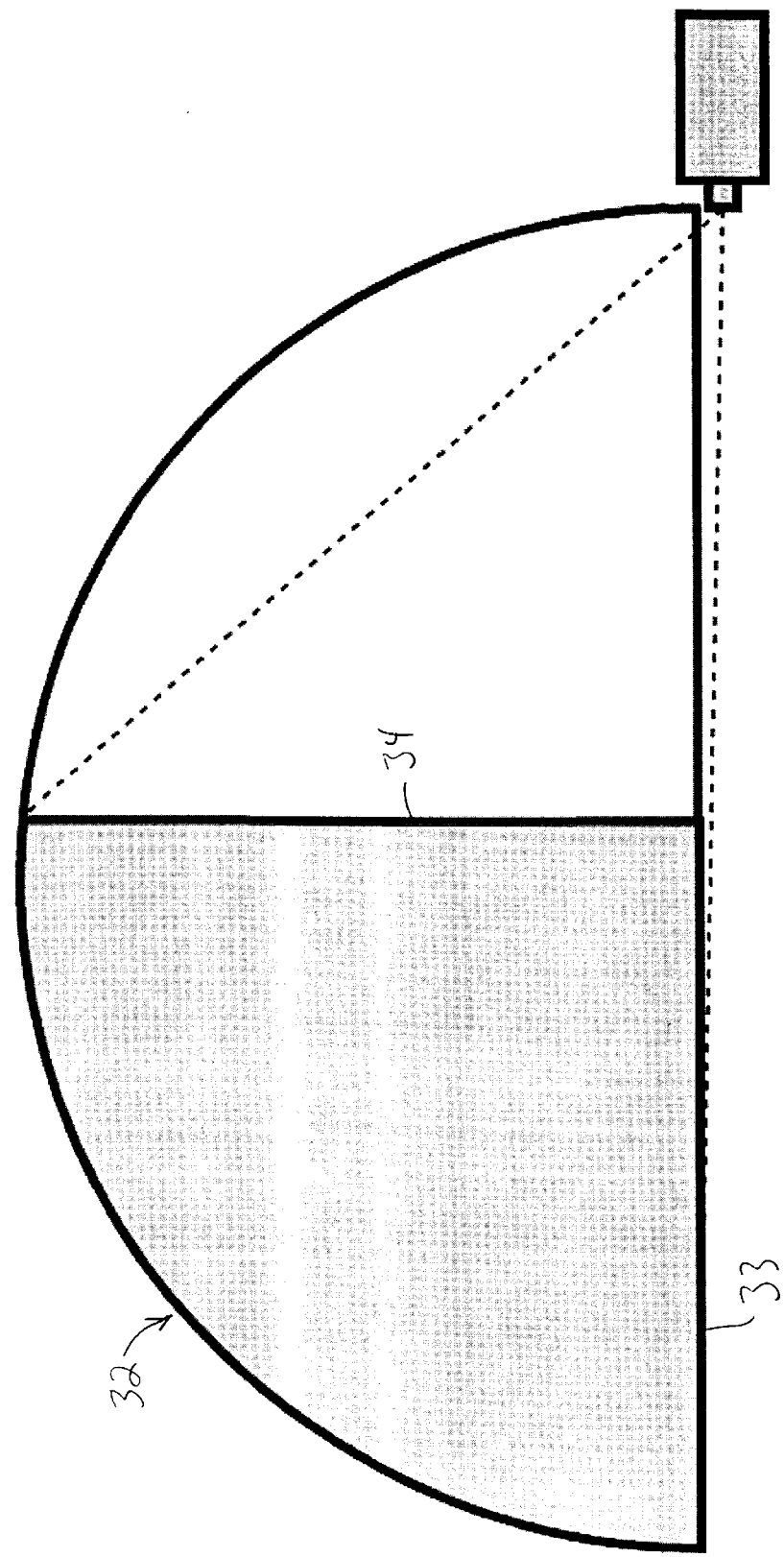
FIG. 14B schematically illustrates an alternative truncation of a screen produced in accordance with the present invention.

An alternative screen truncation is show in FIG. 14B. The screen 32 shown in FIG. 14B is truncated on the bottom 33, at the spherical equator, and on the top and sides by a minor circle 34 that intersects with the equator. This geometry only requires use of the top half of the lens field-of-view, and requires a half-circle-shaped image only on the top-half of the image modulator plane. Providing a vertical displacement of the projection lens assembly with respect to the image modulator allows more efficient use of the image modulator area (which is otherwise not utilized in the lower half of the vertical field-of-view). Such truncation has application in a hemispheric or near-hemispheric theater, where more than half of the hemisphere is covered by a single projector. Two such projectors can be used to provide full hemispheric coverage, with appropriate overlap for edge-blending.

The screen is preferably formed of perforated aluminum, manufactured according to the foregoing screen calculations. Various microstructures are also possible that will direct light from the screen directly back to the audience and prevent scattered light from washing out the image.

The images acquired for presentation in the foregoing geometries must be prepared in an equidistant polar format to achieve perfect eyepoint mapping. This can be accomplished directly, using 3D rendering platforms such as a "3D Studio Max" or equivalent platform. Live action image capture is also possible, using a film camera or an HDTV camcorder coupled with a fisheye lens. If anamorphic projection is employed, for example, to develop the previously described 10:3 format, the preferred embodiment of the invention will incorporate a corresponding anamorphic element on the live action lens. An alternative method for capturing imagery for display with anamorphic projection can include, but is not limited to, capturing imagery with a fisheye lens and truncating the dimension of the image capture area, and using post-processing techniques to expand and interpolate new image data to be compressed by the anamorphic element.

Although the foregoing works equally well with film or video media, high-definition video is the preferred medium. For live action, a ⅔" CCD-based HD camera such as the Sony HDW-700 is preferred. This camera utilizes the newer 1080i High Definition format. Recording and playback are accomplished using a digital tape deck or preferably, for playback mode, a hard-drive based digital video player such as the QuBit system, by QuVis. Projection is preferably performed using a high-resolution technology such as liquid crystal on silicon (LCoS). A JVC 5000 series projector which has 1365×1024 pixels, or a QXGA model projector with 2048×1536 pixels, should produce a good image. Higher resolutions are preferable, and can be adapted to the system of the present invention as new projection technologies develop.

Figure 15A:
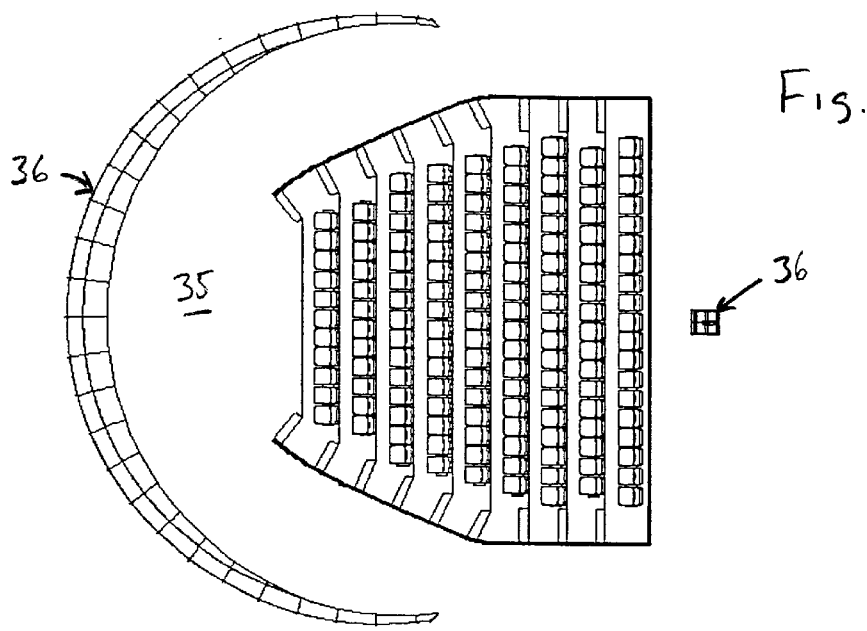
FIG. 15A is a top plan view of a theater incorporating a preferred embodiment system for producing the projection geometries of the present invention.
Figure 15B:
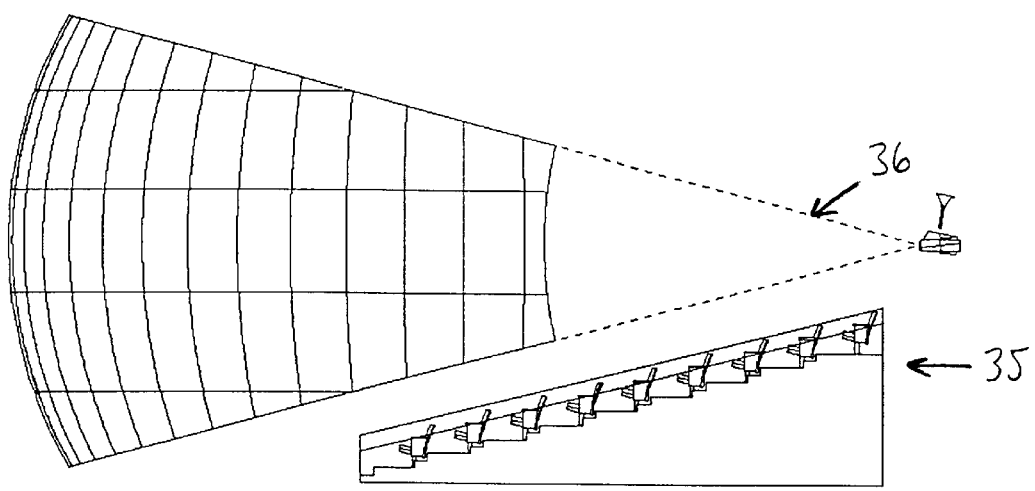
FIG. 15B is a cross-sectional view of the theater shown in FIG. 15A.

FIGS. 15A and 15B show a theater 35 incorporating a preferred embodiment projection system 36 which can yield a simple, affordable medium that is reliable and easily maintained. The difficult alignment and color balancing of multiple projectors which was previously required, and the multiple playback sources that necessitated the splitting of prior productions into multiple sub-frames, is eliminated.

The projection system of the present invention preferably functions in hemispherical theaters having a diameter of from about 12 to about 100 feet, with the projector lens located at the diameter (outside wall) of the theater. The projected image used by the system is preferably comprised of 1152×2048 pixels (out of an available 1536×2048) for a 16:9 aspect ratio.

The following provides a presently preferred configuration for one such projection system, implemented with a JVC DLA-QX1G projector system using a D-ILA image generator, available from JVC Corporation. The D-ILA image generator is comprised of 2048 (horizontal) by 1536 (vertical) pixels with a square pitch of 12.9 microns. The aspect ratio of the D-ILA image generator is 4:3 and the diagonal size is either 33 mm (1.30 inches) or 26.42 mm (horizontal) by 19.81 mm (vertical). The resulting projector lens package is much longer than the stock projection lens supplied with the JVC projector system. As a consequence, the lens is not self supporting, as would the stock lens, and for this reason, a mechanical support for the entire system is preferably used.

Figure 16:
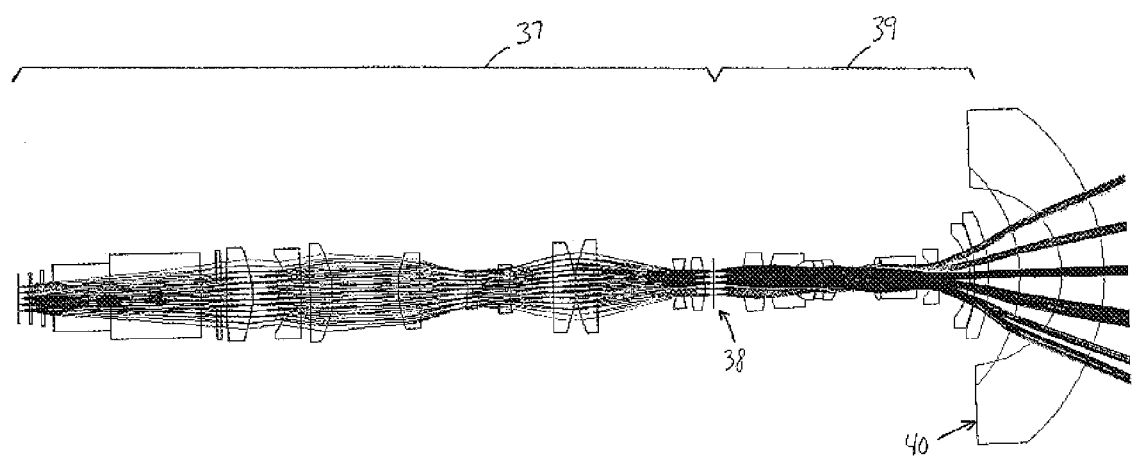
FIG. 16 shows a lens for implementing the projection system of the present invention.

Referring to FIG. 16, the optics of the lens system is preferably comprised of four distinct subassemblies. A projection image relay lens element 37 with a 1:1 magnification forms a first subassembly. A removable mechanical linkage (schematically shown at 38) forms a second subassembly and is affixed between the relay lens element 37 and a downstream "fisheye" projection lens element 39 (which forms a third subassembly) to maintain parallelism between the optical axes of the relay lens and the projector. The mechanical linkage also provides an adjustable frame border at the intermediate image to darken the edges of the projected frame, and a vertical offset adjustment capability. The fisheye projection lens element 39 forming the third subassembly operates to project an intermediate image onto the inside of a spherical screen. The optical axis of the fisheye projection lens element 39 is horizontal and the center of the image is one screen diameter from the projection lens. An anamorphic lens attachment 40 optionally forms a fourth subassembly and operates to reduce (de-magnify) the vertical projection angle by a factor of 0.533. Such optics can be produced using materials and methods which will be readily understood by the person of ordinary skill in the art of lens design.

The projection lens element is preferably an achromatic system covering the human visual color range. The three wavelengths preferably used for evaluation are 480 nanometers, 546.07 nanometers and 656.27 nanometers. These three wavelengths are equally weighted for rms spot calculations and are selected for accuracy of the optical glass data, corresponding to the F', e and C wavelengths used by the glass industry. The transmissivity of the entire system is greater than 80% for each of the three wavelengths. A BBAR coating is recommended for each lens surface. Vignetting of 10% is allowed at 57 degrees off the optical axis, and vignetting of 20% is allowed at the edge of the field of projection, 62.5 degrees off the optical axis. The outside diameter of each lens is preferably blackened to minimize scattered light. The interior of the lens cell is preferably coated a flat black and the area between the relay lens cell and the projector lens cell is preferably flat black and covered by a black flexible bellows.

The relay lens element will preferably form a flat image having a 33 mm diameter flat source with the following characteristics. The relay lens element will have a telecentric input to capture the maximum energy reflecting off of the D-ILA image generator, and an input acceptance angle f/number of 3.4. The relay lens element will accommodate the image combiner optics (i.e., beam splitter cubes) of the image generator.

The intermediate image produced by the relay lens element is preferably telecentric to allow an expansion of hardware capability in the region of the frame border. The rms spot size at the intermediate image will be the same size as the D-ILA pixel dimension. For a 1:1 relay lens element, the rms spot size will be 12.9 microns. For magnifying or de-magnifying relay lens elements, the rms spot size will be adjusted proportionately.

The relay distortion is preferably kept to less than 0.04% at 0.65 inches off axis. The intermediate image can be projected through a spatial light modulator with the same pixel arrangement as the D-ILA image. To support this hardware capability expansion, the pixel mismatch at the edge of the image should not exceed a quarter of a pixel, and there should preferably be less than 0.02% distortion at 0.65 inches off axis in the relay focal plane.

The mechanical linkage is removable, and operates to join the relay lens element with the fisheye projection lens. A rectangular frame border (field stop) is preferably installed at the intermediate relay image. The frame border is comprised of four adjustable knife edge jaws or equivalent structures, which are preferably driven by lockable micrometer adjustment screws. The jaws are flat black for maximum absorption. A four bar mechanical linkage, or an equivalent structure, is preferably provided to allow the fisheye projection lens to be displaced vertically, up to 0.4 inches, while maintaining parallelism between the two optical axes. The fisheye projection lens is preferably elevated with a precision laboratory jack under the center of gravity, or using an equivalent mechanism. The support for the fisheye projection lens allows the necessary refocus adjustment.

The fisheye projection lens will be capable of a circular field of projection of 125 degrees from edge to edge. Of this, the central 114.7 degrees is critical for performance. With respect to this central region, the mathematical transformation from focal plane distance (off the axis) to projection angle should be linear (i.e., the lens will have an exact F*Theta distortion characteristic for the central 114.7 degrees, except as noted below). To be noted is that this distortion requirement applies to the entire lens system (relay plus projector).

It is critical to the successful operation of the optical system that projected images of moving objects do not present a change in proportion or aspect to the audience as they move from one edge of the display to the other. In order to present the most realistic scene motion possible, the departure from F*Theta distortion of the projection lens should have no third order (or higher order) error terms that are greater than 0.2%. The second order error term should not be greater than 2% at 57.35 degrees off the optical axis. These projection error terms are determined by curve-fitting a polynomial to the centroids (in angle) of 11 equally spaced focal plane spots starting on axis and spanning a total of 57.35 degrees. Again, this distortion requirement applies to the entire lens system (relay plus projector).

The projected region between 57.35 and 62.5 degrees off axis should have a departure from true F*Theta distortion not exceeding 4%. The rms projected, angular spot size should equal 3 arc minutes or less. Again, this angular spot size requirement applies to the entire lens system (relay plus projector). An infinity focus for the projector lens would produce an acceptably small spot size at any theater diameter.

The anamorphic lens attachment is optionally provided to change the HDTV 16×9 format (providing 1920×1080 pixels) to the 10×3 format required by the overall system (i.e., for the theater receiving the display). This can be done by reducing (de-magnifying) the vertical projection angle by a factor of 0.533. The anamorphic lens attachment should further provide an rms projected angular spot that is 1.6 arc minutes or less, in the vertical dimension, and 3 arc minutes or less in the horizontal dimension. The 125 degree horizontal spread, as well as the other optical requirements of the projection lens system, should in such case be maintained.

In terms of overall environment, the desired thermal limits for the system should be 40 to 90 degrees Fahrenheit, in operation (with refocus adjustment allowed), and −30 to 120 degrees F. for shipping and storage, with no loss of performance at subsequent operational temperatures. The entire lens system should be capable of sustaining a peak shock of 20G's while detached from the projector, with no subsequent loss of performance. The lens assembly should not protrude more than 30 inches beyond the last combiner optical surface. The surface quality of each lens should meet scratch and dig limits of 60–40 per Mil-O-13830. The antireflection lens coatings should meet the durability requirements of Mil-C-48497. A bayonet style lens mount is presently preferred for mating with projectors such as those previously mentioned. This style of lens mount requires that the relay, a front collar or the entire lens rotate as it is mounted to the projector.

While the invention has been described with reference to a preferred embodiment thereof, it will be appreciated by those of ordinary skill in the art that modifications can be made to the parts and methods that comprise the invention without departing from the spirit and scope thereof. In particular, it is to be understood that although the prior discussion has referred to specific parameters, other parameters and other proportions can be implemented in accordance with the present invention. For example, although a 16:9 aspect ratio and a 10:3 aspect ratio are identified, other aspect ratios can be produced, as needed. Although a ±100 degree (horizontal) by ±30 degree (vertical) field-of-view has been identified, any field of view greater than 120 degrees by 40 degrees can be implemented. Other variations will be apparent to the skilled artisan, including variations responsive to future developments in technology.

What is claimed is:

1. An image projection system comprising:
   a screen having a curved image-receiving surface, wherein the curved surface defines a radial center for the screen, and wherein the center of the screen is separated from the curved surface by a defined radius;
   a projector for relaying ultra-wide field-of-view images onto the screen;
   wherein the projector is positioned at a projection point which is approximately one screen diameter from the image-receiving surface of the screen, and wherein said one screen diameter substantially corresponds to twice the defined radius; and
   a fisheye lens coupled with the projector.

2. The system of claim 1 wherein the screen is substantially spherical in shape.

3. The system of claim 2 wherein the screen defines a diameter of from 12 to 100 feet.

4. The system of claim 1 having only a single projector.

5. The system of claim 4 wherein the projector is a video projector.

6. The system of claim 4 wherein the projector is a film projector.

7. The system of claim 1 wherein the fisheye lens projects the images onto the screen at defined angles, and wherein the fisheye lens has an angle multiplication factor of about 2 for angles projected from a position which diametrically opposes the surface of the screen, relative to angles projected from the center of the screen.

8. The system of claim 7 wherein the field of view for the fisheye lens is reduced by one-half.

9. The system of claim 1 wherein the images are projected in a 16:9 aspect ratio.

10. The system of claim 9 wherein the images are truncated at an image plane of the fisheye lens, producing images on the screen that bulge on top and bQttom edges of the images.

11. The system of claim 1 wherein the images are projected in a 10:3 aspect ratio.

12. The system of claim 11 wherein the projected images are truncated to develop the 10:3 aspect ratio.

13. The system of claim 11 which further includes an anamorphic element coupled with the fisheye lens to develop the 10:3 aspect ratio.

14. The system of claim 1 which further includes a lens system coupled with the projector, wherein the lens system includes a projection image relay lens element having a 1:1 magnification, coupled with a downstream fisheye projection lens element.

15. The system of claim 1 wherein the image is truncated on bottom portions, at a spherical equator defined by the screen, and truncated on top and side portions by a minor circle that intersects with the spherical equator.

16. The system of claim 1 wherein the image has a field-of-view having bottom portions which are truncated so that the image forms a half-circle shape.

17. The system of claim 1 which further includes an additional projector positioned at a projection point which opposes the projection point of the projector.

18. The system of claim 17 wherein the projector and the additional projector combine to provide a full hemispheric image.

19. The system of claim 1 which further includes a lens system coupled with the projector, wherein the lens system includes a projection image relay lens element, a downstream spacial light modulator, and a downstream fisheye projection lens element.

20. A method for projecting a series of images onto a screen having a curved image-receiving surface, wherein the curved surface defines a radial center for the screen, wherein the center of the screen is separated from the curved surface by a defined radius, and wherein the method comprises the steps of:

positioning a projector for relaying ultra-wide field-of-view images onto the screen at a projection point which is approximately one screen diameter from the image-receiving surface of the screen, wherein said one screen diameter substantially corresponds to twice the defined radius; and projecting the series of images onto the screen using the projector and through a fisheye lens coupled with the projector, from the projection point which is approximately one screen diameter from the image-receiving surface of the screen.

21. The method of claim 20 wherein the screen is substantially spherical in shape.

22. The method of claim 20 which further includes the step of projecting the images from only one projector.

23. The method of claim 20 wherein the series of images are video images.

24. The method of claim 20 wherein the series of images are film images.

25. The method of claim 20 which further includes the step of projecting the images onto the screen at defined angles, wherein the fisheye lens has an angle multiplication factor or about 2 for angles projected from a position which diametrically opposes the surface of the screen relative to angles projected from the center of the screen.

26. The method of claim 25 which further includes the step of reducing the field of view for the fisheye lens by one-half.

27. The method of claim 20 wherein the images are projected in a 16:9 aspect ratio.

28. The method of claim 27 which further includes the step of truncating the images at an image plane of the fisheye lens, producing images on the screen that bulge on top and bottom edges of the images.

29. The method of claim 20 wherein the images are projected in a 10:3 aspect ratio.

30. The method of claim 29 which further includes the step of truncating the projected images to develop the 10:3 aspect ratio.

31. The method of claim 30 wherein the truncating includes the step of truncating the images projected onto the screen along a great circle on right and left edges of the images.

32. The method of claim 30 wherein the truncating includes the step of truncating the images projected onto the screen along a horizontal minor circle along a top edge of the images.

33. The method of claim 30 wherein the truncating includes the step of projecting the image onto the screen with an anamorphic element coupled with the fisheye lens.

34. The method of claim 20 wherein the images are produced in a 10:3 aspect ratio.

35. The method of claim 20 wherein the images have a field of view which is greater than 120 degrees by 40 degrees.

36. The method of claim 35 wherein the images have a 200 degree horizontal by 60 degree vertical field of view.

37. The method of claim 20 which further includes the steps of truncating the images on bottom portions, at a spherical equator defined by the screen, and truncating the images on top and side portions by a minor circle that intersects with the spherical equator.

38. The method of claim 20 which further includes the step of truncating bottom portions of the image field-of-view to form the images with a half-circle shape.

39. The method of claim 20 which further includes the step of positioning an additional projector at a projection point which opposes the projection point of the projector.

40. The method of claim 39 which further includes the step of combining the projector and the additional projector to provide a full hemispheric image.

41. The method of claim 20 which further includes the step of projecting the images through a lens system coupled with the projector, wherein the lens system includes a projection image relay lens element, a downstream spacial light modulator, and a downstream fisheye projection lens element.

42. A method for establishing a screen geometry having screen edges lying on planes approximating edges of an image projected onto a curved screen, comprising the steps of:

defining three points along the curved screen that lie on a first image edge;

deriving a circle on the curved screen that passes through the three defined points, to establish a first one of the planes intersecting the curved screen; and repeating the defining step and the deriving step for additional image edges, to establish additional planes intersecting the curved screen.

43. The method of claim 42 wherein the curved screen is substantially spherical.

44. The method of claim 43 wherein the planes approximating the edges of the image combine to form a substantially rectangular frame.

45. The method of claim 44 wherein the frame has a 16:9 aspect ratio.

46. The method of claim 45 which further includes the step of truncating the image to develop a 10:3 aspect ratio.

47. The method of claim 46 wherein the truncating includes the step of truncating the image projected onto the screen along a great circle on right and left edges of the image.

48. The method of claim 46 wherein the truncating includes the step of truncating the image projected onto the screen along a horizontal minor circle along a top edge of the image.

49. The method of claim 46 wherein the truncating includes the step of projecting the image onto the screen with an anamorphic element.

50. The method of claim 44 wherein the frame has a 10:3 aspect ratio.

51. The method of claim 44 wherein the frame has a field of view which is greater than 120 degrees by 40 degrees.

52. The method of claim 51 wherein the frame has a 200 degree horizontal by 60 degree vertical field of view.

53. The method of claim 44 which further includes the step of establishing a series of four planes which approximate the edges of the image, wherein two of the planes are mirror images of another two of the planes.

54. A screen geometry having screen edges lying on planes approximating edges of an image projected onto a curved screen, wherein the planes approximating the edges of the image are established by a method comprising the steps of:

defining three points along the curved screen that lie on a first image edge;

deriving a circle on the curved screen that passes through the three defined points, to establish a first one of the planes intersecting the curved screen; and repeating the defining step and the deriving step for additional image edges, to establish additional planes intersecting the curved screen.

55. The screen geometry of claim 54 wherein the image is projected onto the curved screen using a fisheye lens.

56. The screen geometry of claim 55 wherein the curved screen is substantially spherical in shape.

57. The screen geometry of claim 54 wherein the planes approximating the edges of the image combine to form a substantially rectangular frame.

58. The screen geometry of claim 57 wherein the frame has a 16:9 aspect ratio.

59. The screen geometry of claim 57 wherein the frame has a 10:3 aspect ratio.

60. The screen geometry of claim 57 wherein the frame has a field of view which is greater than 120 degrees by 40 degrees.

61. The screen geometry of claim 60 wherein the frame has a 200 degree horizontal by 60 degree vertical field of view.

62. The screen geometry of claim 57 wherein a series of four planes are established for approximating the edges of the image, and wherein two of the planes are mirror images of another two of the planes.

63. A curved screen having screen edges lying on planes approximating edges of an image projected onto the screen, and having the screen geometry of claim 54.

64. The screen of claim 63 wherein the curved screen is substantially spherical in shape.

65. The screen of claim 64 wherein the screen defines a diameter of from 12 to 100 feet.

66. The screen of claim 63 wherein the planes approximating the edges of the image combine to form a substantially rectangular frame.

67. The screen of claim 66 wherein the frame has a 16:9 aspect ratio.

68. The screen of claim 66 wherein the frame has a 10:3 aspect ratio.

69. The screen of claim 66 wherein the frame has a field of view which is greater than 120 degrees by 40 degrees.

70. The screen of claim 69 wherein the frame has a 200 degree horizontal by 60 degree vertical field of view.

71. The screen of claim 63 wherein the screen is formed of perforated aluminum.

72. A method for acquiring a series of images for presentation on a curved screen having the screen geometry of claim 54, comprising the step of preparing the series of acquired images for presentation in an equidistant polar format.

73. The method of claim 72 wherein the series of images are acquired with only a single image acquiring device.

74. The method of claim 73 wherein the series of images are acquired with a video camera.

75. The method of claim 73 wherein the series of images are acquired with a film camera.

76. The method of claim 73 wherein the series of images are acquired with a camera fitted with a fisheye lens.

77. The method of claim 76 wherein the series of images are acquired in a 16:9 aspect ratio.

78. The method of claim 77 which further includes the step of truncating the series of images to develop a 10:3 aspect ratio.

79. The method of claim 78 wherein the truncating includes the steps of truncating dimensions of the acquired image capture area, and expanding and interpolating new image data to be compressed by the truncating.

80. The method of claim 78 wherein the truncating includes the step of expanding the acquired image area beyond the 10:3 aspect ratio.

81. The method of claim 78 wherein the truncating includes the step of acquiring the series of images with an anamorphic element coupled with the fisheye lens.

82. The method of claim 76 wherein the series of images are acquired in a 10:3 aspect ratio.

83. A lens system for use with an image projection system including a screen having a curved image-receiving surface defining a radial center for the screen, wherein the center of the screen is separated from the curved surface by a defined radius, and a projector for relaying ultra-wide field-of-view images onto the screen, wherein the lens system comprises:

a projection image relay lens element having a 1:1 magnification, coupled with a downstream fisheye projection lens element;

wherein the lens system is coupled with the projector so the projector is positioned at a projection point which is approximately one screen diameter from the image-receiving surface of the screen, and wherein said one screen diameter substantially corresponds to twice the defined radius.

84. The lens system of claim 83 wherein the relay lens element and the fisheye lens element are adjustably connected by a mechanical linkage.

85. The lens system of claim 84 wherein the mechanical linkage is adjusted to maintain parallelism between an optical axis of the relay lens element and an optical axis of the projector.

86. The lens system of claim 85 wherein the mechanical linkage is adjustable in vertical offset.

87. The lens system of claim 83 wherein the relay lens element produces a telecentric image.

88. The lens system of claim 83 wherein the fisheye lens element is capable of a circular field of projection of about 125 degrees, from edge to edge.

89. The lens system of claim 83 which further includes an anamorphic lens attachment coupled with the fisheye lens element.

90. The lens system of claim 89 wherein the anamorphic lens attachment reduces a vertical projection angle of the image by a factor of 0.533.

91. The lens system of claim 83 which further includes a spacial light modulator coupled with the relay lens element and the fisheye lens element.

* * * * *